(12) United States Patent
Murai

(10) Patent No.: US 8,773,877 B2
(45) Date of Patent: Jul. 8, 2014

(54) POWER SUPPLY CIRCUIT FOR LED LIGHT CIRCUIT

(75) Inventor: Yuzo Murai, Tokyo (JP)

(73) Assignee: Nihonmakisen Kogyo Co., Ltd., Tokyo (JP)

( * ) Notice: Subject to any disclaimer, the term of this patent is extended or adjusted under 35 U.S.C. 154(b) by 430 days.

(21) Appl. No.: 13/042,608

(22) Filed: Mar. 8, 2011

(65) Prior Publication Data

US 2012/0120690 A1 May 17, 2012

(30) Foreign Application Priority Data

Nov. 17, 2010 (JP) ................................ 2010-256646

(51) Int. Cl.
*H02M 7/00* (2006.01)

(52) U.S. Cl.
USPC .............. 363/125; 307/17; 323/359; 336/148

(58) Field of Classification Search
USPC ............. 307/17; 323/305, 355, 359; 336/148; 363/125
See application file for complete search history.

(56) References Cited

U.S. PATENT DOCUMENTS

| 4,906,859 A * | 3/1990 | Kobayashi et al. ............. 307/17 |
| 2010/0176755 A1 | 7/2010 | Hoadley et al. |
| 2012/0120690 A1 * | 5/2012 | Murai ............................. 363/55 |

FOREIGN PATENT DOCUMENTS

| CN | 101 106 674 B | 11/2010 |
| DE | 41 24 864 A1 | 1/1993 |
| JP | 2007-274751 A | 10/2007 |
| KR | 2010 0118725 A | 11/2010 |

OTHER PUBLICATIONS

European Search Report Dated Feb. 12, 2013.

\* cited by examiner

*Primary Examiner* — Jeffrey Sterrett
(74) *Attorney, Agent, or Firm* — Norris McLaughlin & Marcus, P.A.

(57) ABSTRACT

A power supply circuit enabling provision of good energy efficiency and downsizing is provided. A power supply circuit 1 according to the present invention includes: input terminals 2, 2 connected to a commercial power supply 10; a winding 4 serially connected between the input terminals 2, 2 via input conductors 3; and a plurality of output terminals 6A, 6B connected to opposite ends of respective windings 4A and 4B resulting from dividing the entire winding 4 into a plurality of parts via output conductors, the respective output terminals 6A and 6B being independently connected to respective loads 20A and 20B.

20 Claims, 11 Drawing Sheets

ACTUAL MEASUREMENT DATA

| | $R_1$ [Ω] | $V_1$ [V] | $I_1$ [mA] | $R_2$ [Ω] | $V_2$ [V] | $I_2$ [mA] | $I_0$ [mA] | $\Delta I_1$ [mA] | $\Delta I_0$ [mA] |
|---|---|---|---|---|---|---|---|---|---|
| (A) | 251 | 49.8 | 198.4 | 502 | 50.8 | 101.2 | 148.0 | 35.3 | 16.0 |
| (B) | 301 | 49.1 | 163.1 | 502 | 50.5 | 100.6 | 132.0 | 22.8 | 12.0 |
| (C) | 350 | 49.1 | 140.3 | 502 | 49.9 | 99.4 | 120.0 | 17.6 | 9.0 |
| (D) | 400 | 49.1 | 122.7 | 502 | 49.7 | 99.0 | 111.0 | 13.4 | 7.0 |
| (E) | 450 | 49.2 | 109.3 | 502 | 49.4 | 98.4 | 104.0 | 10.9 | 5.0 |
| (F) | 503 | 49.5 | 98.4 | 502 | 49.3 | 98.2 | 99.0 | 8.1 | 4.0 |
| (G) | 549 | 49.6 | 90.3 | 502 | 49.3 | 98.2 | 95.0 | 7.5 | 4.0 |
| (H) | 600 | 49.7 | 82.8 | 502 | 49.5 | 98.6 | 91.0 | 6.5 | 3.0 |
| (I) | 650 | 49.6 | 76.3 | 502 | 49.4 | 98.4 | 88.0 | 5.0 | 3.0 |
| (J) | 701 | 50.0 | 71.3 | 502 | 49.5 | 98.6 | 85.0 | 4.9 | 2.0 |
| (K) | 751 | 49.9 | 66.4 | 502 | 49.3 | 98.2 | 83.0 | 4.0 | 2.0 |
| (L) | 801 | 50.0 | 62.4 | 502 | 49.5 | 98.6 | 81.0 | 3.7 | 2.0 |
| (M) | 852 | 50.0 | 58.7 | 502 | 49.1 | 97.8 | 79.0 | 3.2 | 2.0 |
| (N) | 901 | 50.0 | 55.5 | 502 | 49.1 | 97.8 | 77.0 | 2.8 | 1.0 |
| (O) | 950 | 50.1 | 52.7 | 502 | 49.2 | 98.0 | 76.0 | 2.5 | 1.5 |
| (P) | 1000 | 50.2 | 50.2 | 502 | 49.4 | 98.5 | 74.5 | — | — |

FULL-WAVE RECTIFIER CIRCUIT

CURRENT LIMITER CURCUIT

R : CURRENT LIMITING RESISTANCE

CONSTANT CURRENT CIRCUIT

IC : CONSTANT-VOLTAGE/CONSTANT-CURRENT IC $V_A = V_B = V_C$ $V_A \neq V_B \neq V_C$ $V_H > V_{L1} + V_{L2}$ $V_H \cdot I_0 = V_{L1} \cdot I_{L1} + V_{L2} \cdot I_{L2}$ $V_H < V_{L1} + V_{L2}$ $V_H \cdot I_0 = V_{L1} \cdot I_{L1} + V_{L2} \cdot I_{L2}$ $N_A = N_1 + N_4$    $N_B = N_2$    $N_C = N_3$

POWER SUPPLY CIRCUIT FOR LED LIGHT CIRCUIT

BACKGROUND OF THE INVENTION

1. Field of the Invention

The present invention relates to a power supply circuit that divides power from a commercial power supply and supplies the power to loads, which is favorable for use as a power supply for an electric device, for example, an LED device, such as an indoor/outdoor lighting device, an electronic billboard, colored lights or a signboard, or a heater device such as a floor heater or a snow-melting system.

2. Description of the Related Art

In recent years, devices using LEDs, which have long-life and low-power consumption, have commonly been distributed for the aforementioned electric devices. For such a power supply circuit for an LED device, for example, the switching power supply disclosed in Japanese Patent Laid-Open No. 2007-274751 is known.

In the switching power supply in Japanese Patent Laid-Open No. 2007-274751, a main circuit thereof includes: a noise filter circuit including capacitors and coils; a rectifier/smoother circuit including diodes and capacitors; a radiator-equipped power switching element such as a field-effect transistor, and a radio-frequency transformer. Also, in addition to the main circuit, the switching power supply includes a control circuit, an overvoltage protection circuit and an overcurrent protection circuit, and the electronic components included in these circuits are mounted on a circuit board, which is housed in a metal case.

In the aforementioned switching power supply, an input voltage from a commercial power supply is stepped down by means of the radio-frequency transformer to adapt the voltage to a rated voltage for LEDs. However, in the radio-frequency transformer, an iron core is heated by an eddy current generated in the iron core, causing an energy loss called an iron loss. In particular, such iron loss is large in a radio-frequency transformer. Furthermore, the radio-frequency transformer also causes another energy loss, which is a copper loss caused by the resistances of conductors. These iron and copper losses result in a problem in deterioration in energy efficiency of power supply.

Also, in the aforementioned switching power supply, the radiator-equipped power switching element is employed for dissipation of heat in the radio-frequency transformer, and the overvoltage protection circuit and the overcurrent protection circuit are provided for prevention of an LED failure. However, since a large number of electronic components are required for providing these elements and circuits, a circuit board with a large size is needed, causing a problem in causing an increase in size of the power supply. Furthermore, for a method for suppressing the aforementioned energy losses, the current density of the conductors in the radio-frequency transformer may be decreased; however, in this case, it is necessary to increase the wire diameter of the conductors, increasing the weight of the radio-frequency transformer, as well as providing another factor in causing an increase in size of the power supply.

The present invention has been made in view of such problems as described above, and an object of the present invention is to provide a power supply circuit enabling energy efficiency enhancement and downsizing of a power supply.

SUMMARY OF THE INVENTION

In order to achieve the above object, a power supply circuit according to the present invention includes: an input terminal to be connected to a commercial power supply; an input conductor connected to the input terminal; a winding connected to the input conductor; a plurality of output conductors connected to respective partial windings resulting from dividing the winding into a plurality of parts; and a plurality of output terminals connected to the respective output conductors, each output terminal being independently connected to a load.

In the power supply circuit including the above configuration, there are no specific limitations on the form and part count of the winding. For example, a configuration in which the output conductors are connected to the respective partial windings with an end part of the winding left as a margin, an input voltage is stepped down in the winding, and the stepped-down voltage is divided and output or a configuration in which the input conductor is connected to the winding with an end part of the winding left as a margin, an input voltage is stepped up in the winding, and the stepped-up voltage is divided and output may be employed. A two-way divider circuit in which the winding includes an autotransformer, and the power supply circuit includes: first output terminals connected to a beginning end of a series winding and a beginning end of a shunt winding; and second output terminals connected to the beginning end of the shunt winding and an terminal end of the shunt winding can also be employed. A three-way divider circuit in which the winding includes an autotransformer, and the power supply circuit includes: first output terminals connected to a beginning end of a series winding and a beginning end of a shunt winding; second output terminals connected to the beginning end of the shunt winding and a point in the shunt winding; and third output terminal connected to the point in the shunt winding and a terminal end of the shunt winding can also be employed.

Also, the power supply circuit including the above configuration, even if the voltages resulting from the division are not equal to each other, if currents flowing in loads are equal to each other, almost no current flows in the winding, reducing the energy losses. Therefore, in order to reduce the energy losses, it is preferable that the winding be evenly divided in terms of a turn count.

Furthermore, although in the power supply circuit including the above configuration, there are no specific limitations on the loads connected to the output terminals, for example, an electronic device using LEDs can be connected. In such case, it is necessary to convert an alternate voltage supplied from a commercial power supply into a direct-current voltage after transformation of the alternate voltage. Therefore, as a mode of the power supply circuit according to the present invention, a configuration in which a rectifier circuit that converts an alternate-current voltage resulting from division in the winding into a direct-current voltage is provided between the output conductors and the output terminals may be employed. Here, if an LED device is connected to the power supply circuit, it is preferable that a current limiter circuit that limits a current flowing into a load be provided at an output end of the rectifier circuit in order to adapt the current to a rated current for the LEDs.

The power supply circuit according to the present invention efficiently divides an input power supplied from a commercial power supply and supplies the power resulting from the division to respective loads, without causing almost any energy loss. Furthermore, even though one of a plurality of loads varies, the power supply circuit prevents the other loads from being affected by the variation of the load, enabling stable power supply.

Also, the power supply circuit according to the present invention enables designing of the winding according to a current corresponding to a maximum variation width of a load current, and since only very small current flows in the winding, almost no heat is generated in the winding. Accordingly, the power supply circuit eliminates the need to provide a radiator and/or increase the wire diameter of the winding, and thus, can be manufactured using a small-sized winding, enabling downsizing of the power supply circuit.

DETAILED DESCRIPTION OF THE PREFERRED EMBODIMENT

An embodiment of the present invention will be described below with reference to the drawings.

First, a basic configuration of a power supply circuit according to the present invention will be described.

Figure 1:
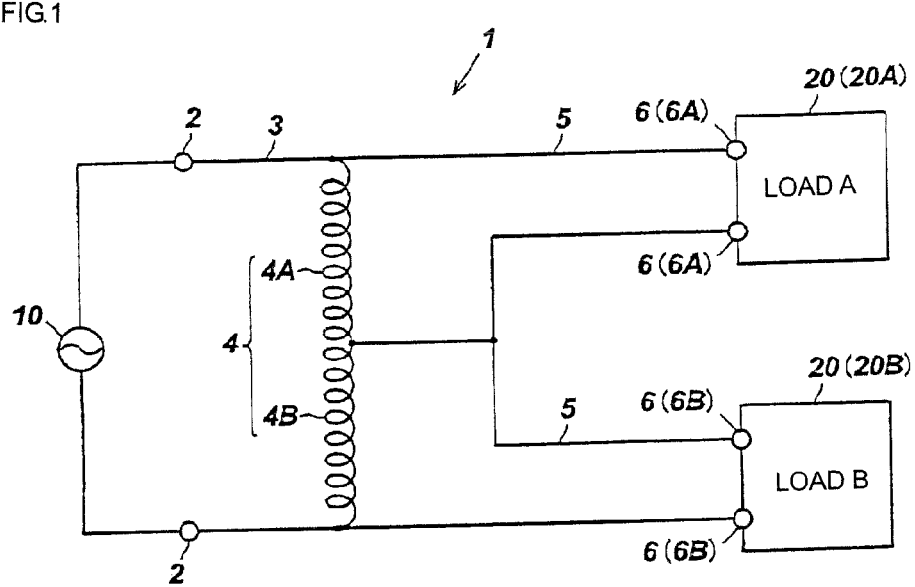
FIG. 1 is a circuit diagram illustrating a basic configuration of a power supply circuit according to the present invention.

As illustrated in FIG. 1, a power supply circuit 1 includes input terminals 2, input conductors 3, a winding 4, output conductors 5 and output terminals 6. Each input terminal 2 is connected to a commercial power supply 10, and an alternate power supply voltage from the commercial power supply 10 is input to the input terminal 2. Between the input terminals 2, 2, the winding 4 is connected in series via the input conductors 3. The winding 4 is divided into a plurality of parts (two parts in this example) between a beginning end and a terminal end thereof, and opposite ends of respective partial windings 4A, 4B resulting from the division are connected to the output conductors 5, 5. Ends of the respective output conductors 5, 5 are provided with respective output terminals 6 (6A, 6B). Furthermore, loads 20 (20A, 20B), which are independent from each other, are connected to the two output terminals 6A, 6B, and stable powers obtained by dividing the alternate power supply voltage by means of the winding 4 are supplied to the loads 20.

Next, the principle of a power supply circuit according to the present invention will be described.

(1) Loads

Figure 2:
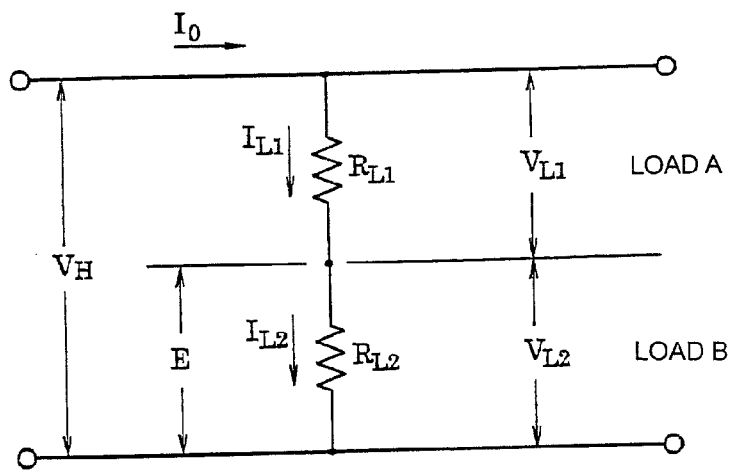
FIG. 2 is a diagram illustrating the principle of a power supply circuit according to the present invention.

Considering a circuit such as illustrated in FIG. 2, the following can be seen.

As a load $R_{L1}$ is varied, currents $I_0$, $I_{L1}$, $I_{L2}$ and voltages $V_{L1}$, $V_{L2}$, E vary.

If $R_{L1} = R_{L2}$, $V_{L1} = V_{L2} = V_H/2$.

If $R_{L1} = R_{L2}$, the voltage E exhibits $E = V_H/2$ irrespective of the voltage $V_H$.

If the voltage E exhibits $E = V_{L1} = V_{L2} = V_H/2$, a voltage of a half of a power supply voltage can be output to each of loads A, B. This means that power, which is a half of a power supply voltage, can efficiently be used in each of the loads A, B with no energy loss.

If $R_{L1} \neq R_{L2}$, $I_{L1} = I_{L2}$, but $V_{L1} \neq V_{L2}$, resulting in the voltage E varying. In this case, the load voltages vary, and thus, the power supply circuit cannot be used for a power supply.

Accordingly, if $R_{L1} = R_{L2}$, the power supply circuit can be used for a power supply. Meanwhile, if $R_{L1} \neq R_{L2}$, the voltages of the loads A, B vary, and thus, the power supply circuit cannot be used for a power supply. Therefore, it is necessary to provide a method for preventing the voltage E varying even if $R_{L1} \neq R_{L2}$.

(2) Winding

Figure 3:
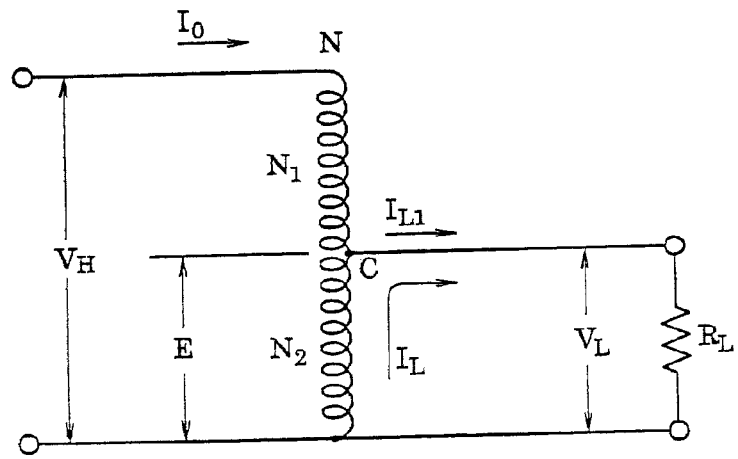
FIG. 3 is a diagram illustrating the principle of a power supply circuit according to the present invention.

In an autotransformer, which is illustrated in FIG. 3, where N is the turn count of the entire winding, $N_1$ is the turn count of a series winding, and $N_2$ is the turn count of a shunt winding, if $N = N_1 + N_2$ and $N_1 = N_2$, the following can be seen.

If a load $R_L$ is varied, $I_L$ varies, but $V_L$ does not vary.

Where $I_L$ is varied, the relationship between a variation amount $\Delta I_L$ of $I_L$ and a variation amount $\Delta I_0$ of $I_0$ is $\Delta I_0 = \Delta I_L/2$.

If the turn counts $N_1$ and $N_2$ are equal to each other, a voltage E at a midpoint C of the winding exhibits $E=V_H/2$ irrespective of the values of the load $R_L$ and an input voltage $V_H$.

(3) Load and Winding Combination

Figure 4:
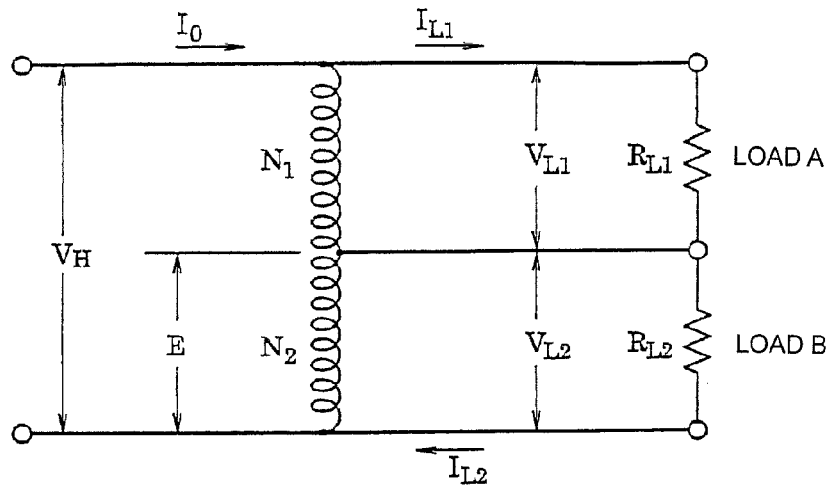
FIG. 4 is a diagram illustrating the principle of a power supply circuit according to the present invention.

Considering an equivalent circuit, which is illustrated in FIG. 4, obtained by combining the circuits in FIGS. 2 and 3, the following can be seen.

Where $N_1=N_2$, $E=V_H/2$ and E has a voltage at a midpoint of $V_H$.

Voltages resulting from division exhibit $V_{L1}=V_{L2}$, enabling stable power supply to $R_{L1}$ (load A) and $R_{L2}$ (load B).

Where $R_{L1}=R_{L2}$, $I_{L1}=I_{L2}=I_0$-exciting current (no-load current), enabling efficient power supply to the loads.

In reality, $I_0 \gg$ exciting current, the value of the exciting current is extremely small so that it can be ignored. With a transformer used for a test, when $I_{L1}=I_{L2}=250$ [mA], the exciting current was 2 to 5 [mA].

(4) Load Variation—Case 1

Figure 5:
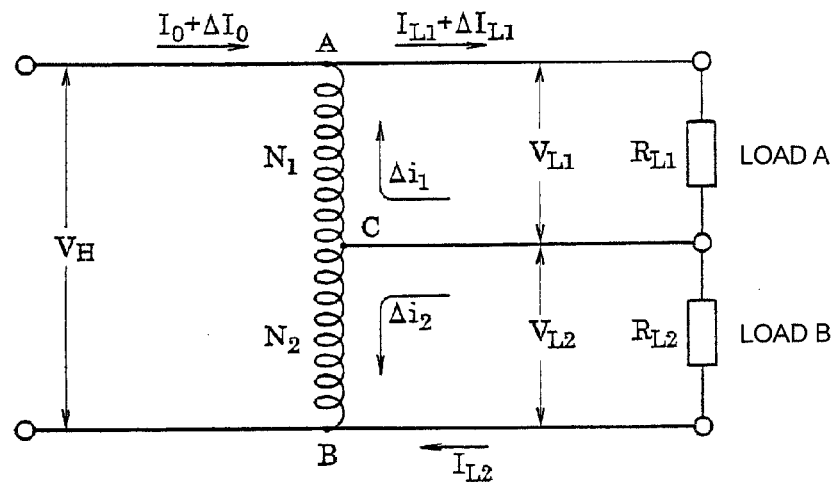
FIG. 5 is a diagram illustrating the principle of a power supply circuit according to the present invention.

With the circuit illustrated in FIG. 5, a case where the balance between loads is varied will be considered. However, it is assumed that $N_1=N_2$, $R_{L2}$ is constant and only $R_{L1}$ is varied ($R_{L1}<R_{L2}$).

If $R_{L2}$ is constant and $R_{L1}$ is varied to be smaller, where an amount of increase of a current flowing in a load A is $\Delta I_{L1}$, and an amount of increase of an input current is $\Delta I_0$, the following can be seen.

$\Delta I_0=\Delta I_{L1}/2$, and $I_{L2}$ does not vary ($V_{L1}=V_{L2}=V_H/2$).

The current in a winding $N_1$ varies by $\Delta i_1$ in the direction from C to A.

Accordingly, $\Delta i_1=\Delta I_{L1}/2=\Delta I_0$.

The current in a winding $N_2$ varies by $\Delta i_2$ in the direction from C to B.

Accordingly, $\Delta i_2=\Delta I_{L1}/2=\Delta I_0$.

Furthermore, an amount of increase in VA on the load side ($V_{L1} \cdot \Delta I_{L1}$) is equal to an amount of increase in VA on the input side ($V_H \cdot \Delta I_0$).

For example, considering the case where $V_H=100$ [V], $N_1=N_2$, $V_{L1}=V_{L2}=50$ [V] and $\Delta I_{L1}=1$ [A], VA on the load side and VA on the input side can be calculated as follows.

Load side: 50 [V]×1 [A]=50 [VA], $\Delta I_{L1}=1$ [A]

Input side: 100 [V]×0.5 [A]=50 [VA], $\Delta I_0=0.5$ [A]

(5) Load Variation—Case 2

Figure 6:
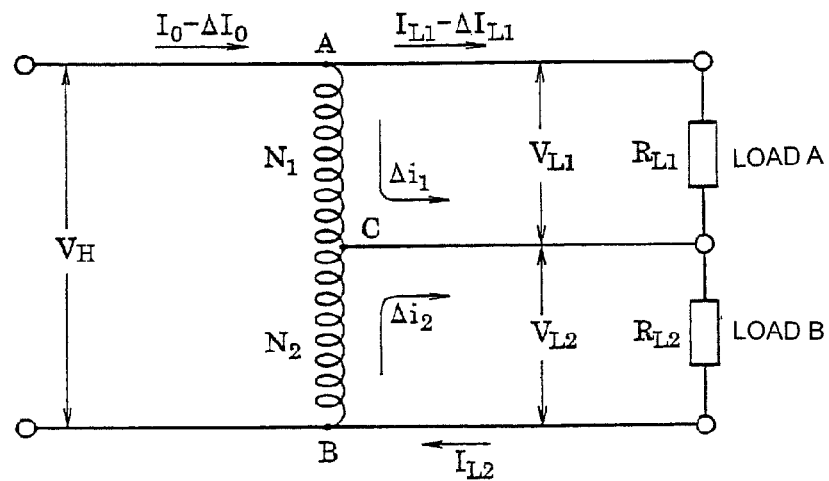
FIG. 6 is a diagram illustrating the principle of a power supply circuit according to the present invention.

With the circuit illustrated in FIG. 6, a case where the balance between the loads is varied will be considered. However, it is assumed that $N_1=N_2$, $R_{L2}$ is constant and only $R_{L1}$ varies ($R_{L1}>R_{L2}$).

If $R_{L2}$ is constant and $R_{L1}$ is varied to be larger, where an amount of decrease in a current flowing in a load A is $\Delta I_{L1}$ and an amount of decrease in an input current is $\Delta I_0$, the following can be seen.

$\Delta I_0=\Delta I_{L1}/2$ and $I_{L2}$ does not vary ($V_{L1}=V_{L2}=V_H/2$).

The current in the winding $N_1$ varies by $\Delta i_1$ in the direction from A to C.

Accordingly, $\Delta i_1=\Delta I_{L1}/2=\Delta I_0$.

The current in the winding N2 varies by $\Delta i_2$ in the direction from B to C.

Accordingly, $\Delta i_2=\Delta I_{L1}/2=\Delta I_0$.

Furthermore, an amount of decrease in VA on the load side ($V_{L1} \cdot \Delta I_{L1}$) is equal to an amount of decrease in VA on the input side ($V_H \cdot \Delta I_0$).

For example, considering the case where $V_H=100$ [V], $N_1=N_2$, $V_{L1}=V_{L2}=50$ [V] and $\Delta I_{L1}=0.5$ [A], VA on the load side and VA on the input side can be calculated as follows.

Load side: 50 [V]×0.5 [A]=25 [VA], $\Delta I_{L1}=0.5$ [A]

Input side: 100 [V]×0.25 [A]=25 [VA], $\Delta I_0=0.25$ [A]

(6) Conclusion

Figures 7, 8:
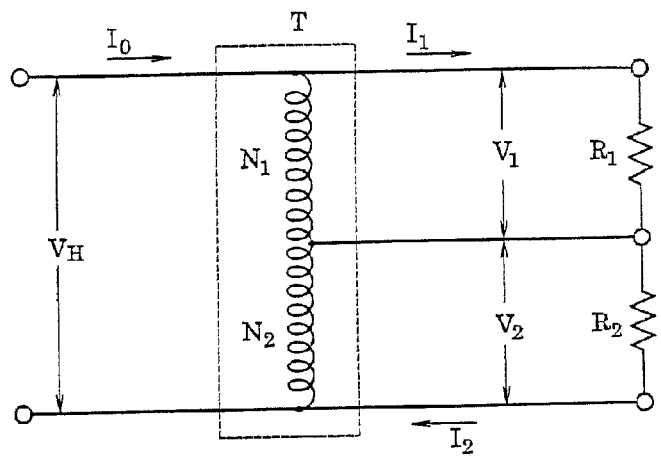
FIG. 7 is a diagram illustrating the principle of a power supply circuit according to the present invention.
FIG. 8 is a chart providing a summary of actual measurement data for a power supply circuit according to the present invention.

From the consideration in sections (1) to (5) above, it can be concluded that the following effects can be provided in the circuit illustrated in FIG. 7.

If load currents are equal to each other ($I_1=I_2$), the size of an autotransformer T can be made to be very small.

The autotransformer T enables efficient power supply with small energy loss such as copper loss and iron loss. In particular, where a toroidal transformer is used, the energy loss is extremely small.

Inclusion of a constant current circuit (current limiter circuit) in a load enables stable power supply even if the load is varied.

Next, actual measurement data for the power supply circuit according to the present invention will be described.

The voltage and current values resulting from variations of a load in the power supply circuit illustrated in FIG. 7 were measured. The measurements were made on the conditions: an input voltage $V_H$ is 100 [V]; a turn count $N_1$ of a series winding and a turn count $N_2$ of a shunt winding in the autotransformer T are equal to each other; the value of the load $R_2$ is constant; and only the value of the load $R_1$ is varied. The measurement results are indicated in the table in FIG. 8. In the table, $V_1$ and $V_2$ are load voltages applied to the loads $R_1$ and $R_2$, $I_0$ is an input current flowing on the primary side, $I_1$ and $I_2$ are load currents flowing in the loads $R_1$ and $R_2$, $\Delta I_0$ is an amount of increase of the input current flowing on the primary side and $\Delta I_1$ is an amount of increase of the load current flowing in the load $R_1$.

As is clear from (F) in the table, where the loads $R_1$ and $R_2$ are equal to each other, the input voltage $V_H$ is evenly divided into two ways, the load voltages $V_1$ and $V_2$ are equal to each other, and the load currents $I_1$ and $I_2$ are both substantially equal to the input current $I_0$.

Figure 9:
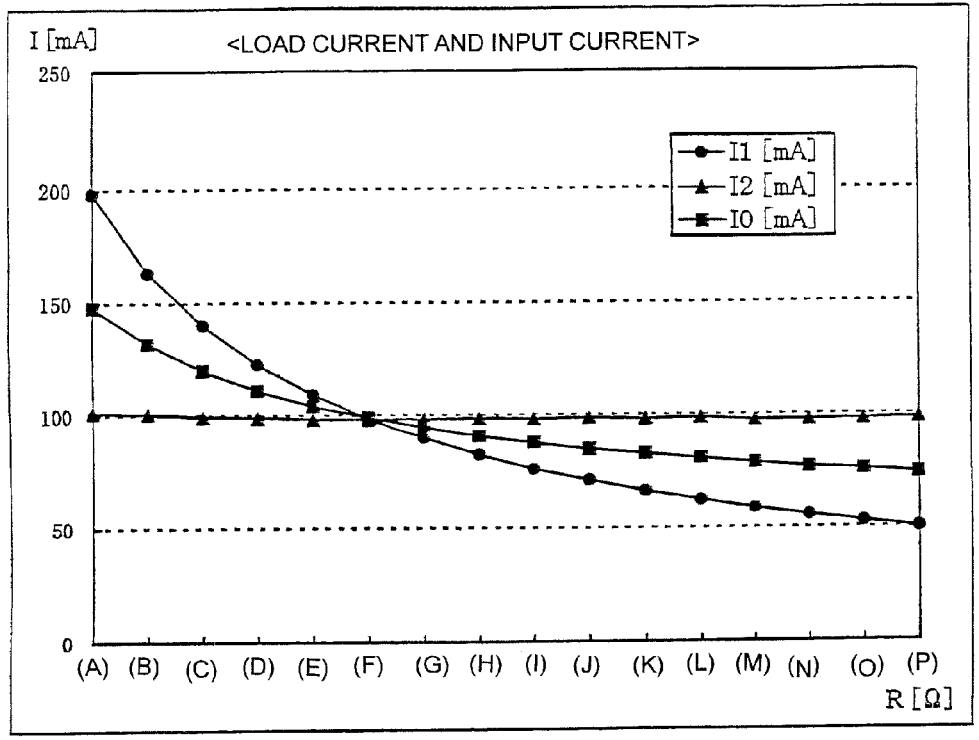
FIG. 9 is a graph indicating a relationship between load currents and an input current.

Considering the case where the load was varied, as indicated in (A) to (E) in the table, even if the load $R_1$ is decreased, the load voltages $V_1$ and V2 are equal to each other with almost no variations. Also, as is clear from the graph in FIG. 9, as the load $R_1$ decreases, the load current $I_1$ and the input current $I_0$ increase respectively, but the load current $I_2$ has almost no variations.

Contrary to the above, as indicated in (G) to (P) in the table, it can be seen that even if the load $R_1$ increases, the load voltages $V_1$ and $V_2$ are equal to each other with almost no variations. Also, as is clear from the graph in FIG. 9, as the load $R_1$ increases, the load current $I_1$ and the input current $I_0$ decrease respectively, but the load current $I_2$ has almost no variations.

Figure 10:
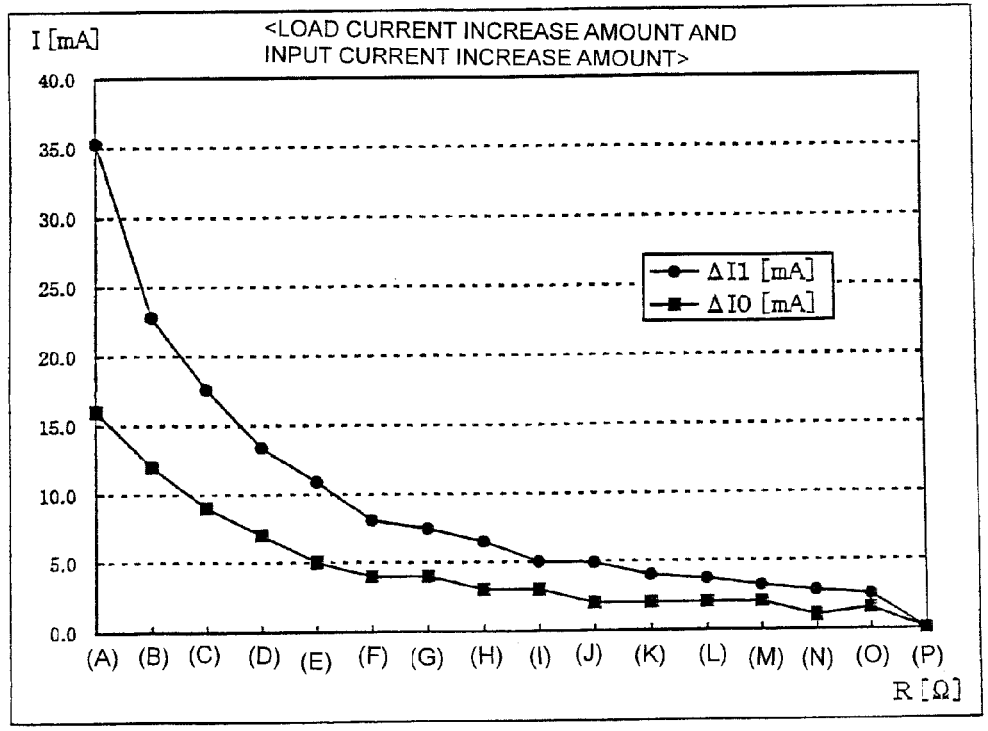
FIG. 10 is a graph indicating a relationship between a load current increase amount and an input current increase amount.

Furthermore, considering the relationship between the load current increase amount $\Delta I_1$, which is a result of variation of the load and the input current increase amount $\Delta I_0$, as indicated in the graph in FIG. 10, it can be seen that the input current increase amount $\Delta I_0$ is approximately a half of the load current increase amount $\Delta I_1$. In (K), (L) and (M) in the table, there are no variations in the input current increase amount $\Delta I_0$, which can be considered to be attributed to measurement errors.

From the above-described measurement results, it has turned out that with the power supply circuit in FIG. 7, the input voltage $V_H$ can efficiently be divided without no energy loss and evenly supplied to the respective loads, and even if one of the loads is varied, such variation does not affect the other load, and the load voltages $V_1$ and $V_2$ resulting from the division are both stable.

Lastly, examples of the power supply circuit according to the present invention will be described.

EXAMPLE 1

Figure 11:
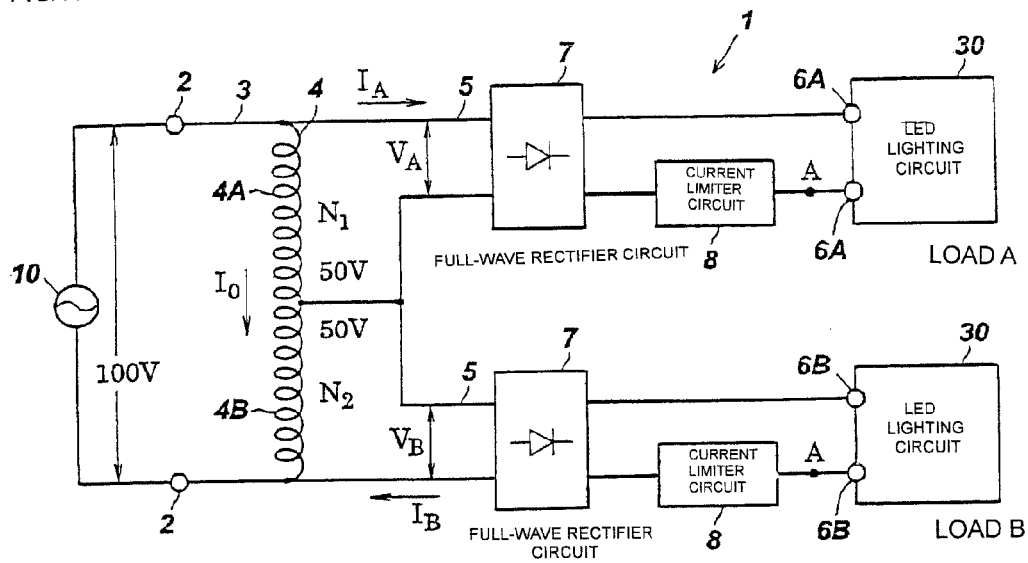
FIG. 11 is a circuit diagram illustrating a two-way divider/rectifier circuit according to example 1 of the present invention.

FIG. 11 illustrates a power supply circuit 1, which is an example of employing the power supply circuit according to the present invention for a power supply for LEDs by connecting the power supply circuit to LED lighting circuits 30, which are loads. In the Figure, the power supply circuit 1, which is a two-way divider/rectifier circuit, includes input terminals 2, input conductors 3, a winding 4, output conductors 5, output terminals 6, full-wave rectifier circuits 7 and current limiter circuits 8.

The input terminals 2 are connected to a commercial power supply 10, and a power supply voltage of AC 100V is input from the commercial power supply 10 to the input terminals 2. In the winding 4, which includes an autotransformer, a beginning end of a series winding 4A and a terminal end 5 of a shunt winding 4B are connected in series between the input terminals 2, 2 via the input conductors 3.

First output terminals 6A from among the two sets of output terminals 6 are connected to the beginning end of the series winding 4A and a beginning end of the shunt winding 4B via the corresponding output conductors 5. The first output terminals 6A are connected to one of the LED lighting circuits 30, which is a load A. Each LED lighting circuit 30 includes a LED group in which a plurality of LEDs is connected in series. Second output terminals 6B, which are the other output terminals 6, are connected to the beginning end of the shunt winding 4B and the terminal end of the shunt winding 4B via the corresponding output conductors 5. As with the first output terminals 6A, the second output terminals 6B are connected to the other LED lighting circuit 30, which is a load B.

Figure 12:
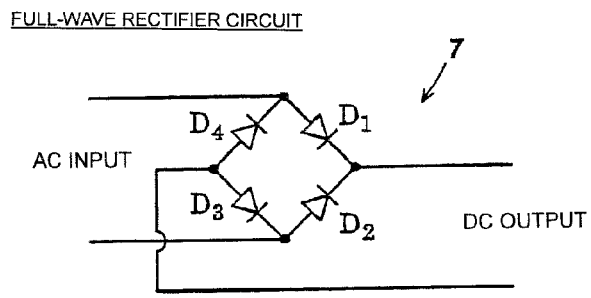
FIG. 12 is a circuit diagram illustrating an example of a full-wave rectifier circuit in FIG. 11.

Output ends of the series winding 4A and the shunt winding 4B are provided with the respective full-wave rectifier circuits 7, 7. For each full-wave rectifier circuit 7, an example of which is illustrated in FIG. 12, a bridge rectifier circuit in which a bridge is formed by four diodes $D_1$ to $D_4$ can be employed. The bridge rectifier circuit receives an input of an alternate-current voltage transformed by the winding 4, performs full-wave rectification to convert the alternate-current voltage to a direct-current voltage, and outputs the direct-current voltage.

Figure 13:
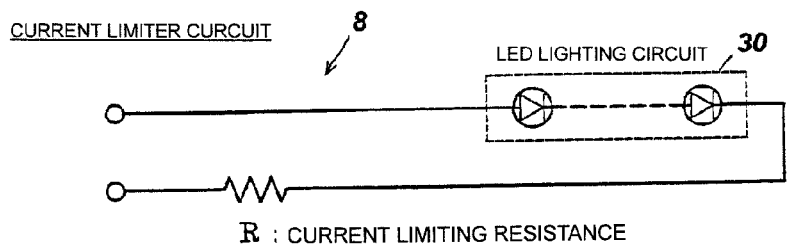
FIG. 13 is a circuit diagram illustrating an example of a current limiter circuit in FIG. 11.

Between the full-wave rectifier circuits 7 and the output terminals 6, 6, respective current limiter circuits 8, 8 are provided. Each current limiter circuit 8 is a protection circuit that limits a current flowing in a load to prevent overcurrent in the load and breakage of the load due to a temperature increase. As in an example illustrated in FIG. 13, each current limiter circuit 8 can include a current limiting resistance R connected in series to an output end of the corresponding full-wave rectifier circuit 7. This configuration limits respective currents flowing in the LED lighting circuits 30 by the current limiting resistance R so as to fall within a rated current for LEDs.

Figure 14:
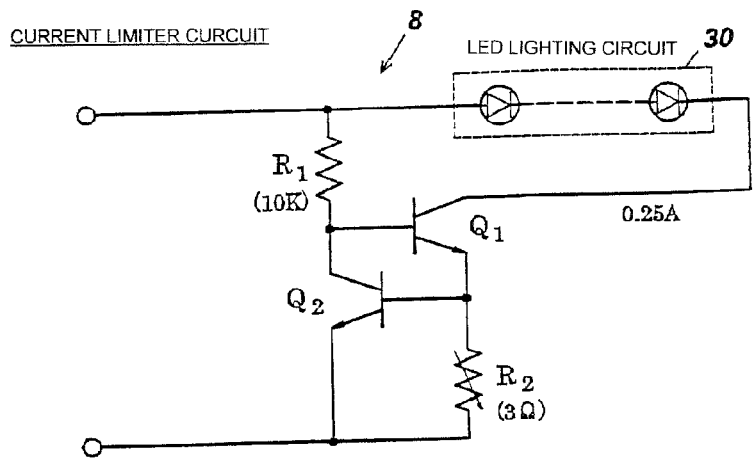
FIG. 14 is a circuit diagram illustrating another example of a current limiter circuit in FIG. 11.

Also, as in another example illustrated in FIG. 14, each current limiter circuit 8 can include a bias resistance R1, two transistors $Q_1$, $Q_2$ and a current detection resistance $R_2$. The bias resistance $R_1$ is connected to an output end of the corresponding full-wave rectifier circuit 7, and a base of the transistor $Q_1$ and a collector of the transistor $Q_2$ are connected to the bias resistance $R_1$. The current detection resistance $R_2$ is connected to an emitter of the transistor $Q_1$ and a base and an emitter of the transistor $Q_2$. With this configuration, upon application of a bias voltage from the bias resistance $R_1$ to the base of the transistor $Q_1$, the transistor $Q_1$ is turned on, causing a current to flow in the corresponding LED lighting circuit 30, thereby the LEDs being turned on. Also, when a current flowing in the current detection resistance $R_2$ exceeds a limited current, the transistor $Q_2$ is turned on, causing the bias voltage in the transistor $Q_1$ to be interrupted, and the transistor $Q_1$ is thereby turned off, preventing an overcurrent exceeding a rated current from flowing in the LED lighting circuit 30.

Figure 15:
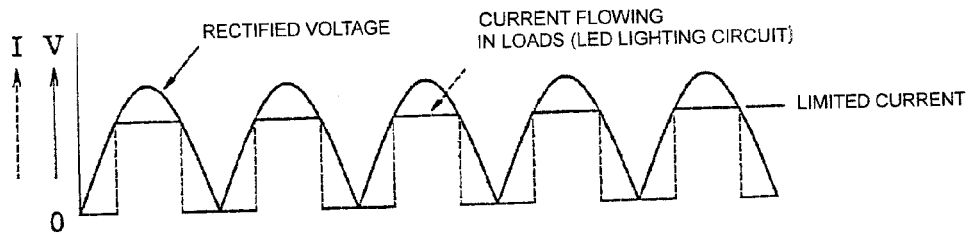
FIG. 15 is a waveform diagram of a voltage and a current at a point A in FIG. 11.

The power supply circuit 1 according to example 1, which is configured as described above, evenly divides an alternate power supply voltage input from the commercial power supply 10, by means of the winding 4, whereby stable power is supplied to the LED lighting circuits 30. A limited current such as illustrated in FIG. 15 flows at a point A in FIG. 11, and thus, flows in the LED lighting circuits 30. Accordingly, there are only small variations among the elements in the loads, and thus, there are only small assembly variations as well. Since each LED lighting circuit 30, which is a load, is provided with the corresponding current limiter circuit 8, the load voltage does not vary, and thus, $V_A = V_B$. Accordingly, the relationship of $I_A \approx I_B$ can be provided for load currents, and thus, the current flowing in the autotransformer becomes small. The value of the current flowing in the autotransformer is around a value of an exciting current for the winding $4 + \frac{1}{2}(I_A - I_B)$.

For the above-described reasons, the power supply circuit 1 according to the present example enables efficient supply of input power supplied from the commercial power supply 10 to the two LED lighting circuits 30, 30. Also, the power supply circuit 1 enables an autotransformer to be designed according to a current adapted to a maximum variation width (maximum value of $\frac{1}{2}(I_A - I_B)$) for load currents, not currents $I_A$, $I_B$ necessary for the loads. Furthermore, since only a very small current flows in the autotransformer, the winding 4 in the autotransformer generates almost no heat. Accordingly, there is no need to provide a radiator or increase the wire diameter of the series winding 4A in the power supply circuit 1, enabling the autotransformer to be manufactured so as to have a small size, and thus, enabling downsizing of the power supply circuit 1.

EXAMPLE 2

Figure 16:
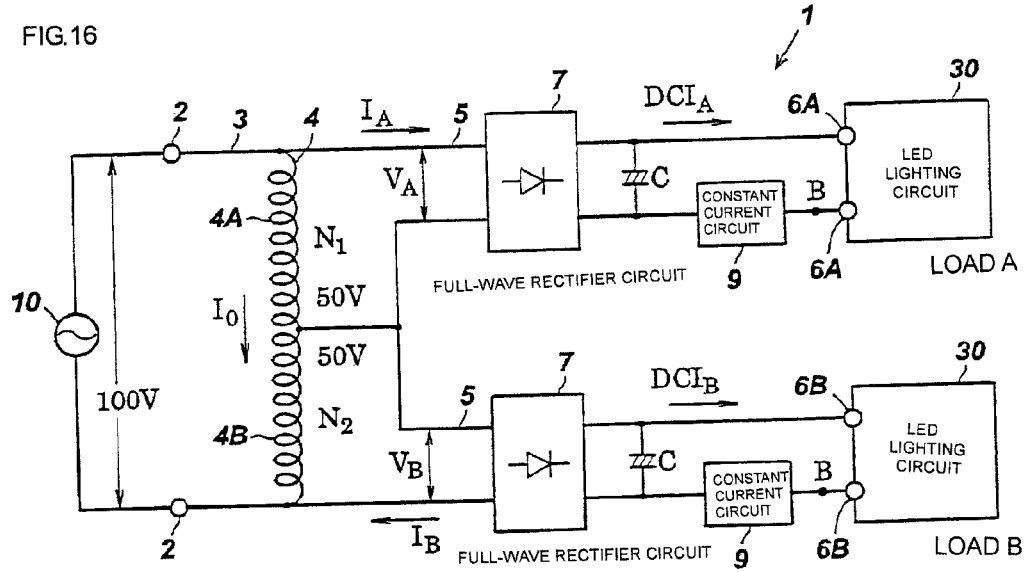
FIG. 16 is a circuit diagram illustrating a two-way divider/rectifier/smoother circuit according to example 2 of the present invention.

FIG. 16 illustrates a power supply circuit 1, which is an example of employing the power supply circuit according to the present invention for a power supply for LEDs by connecting the power supply circuit to LED lighting circuits 30 as in example 1. In the Figure, the power supply circuit 1 is a two-way divider/rectifier/smoother circuit in which electrolytic capacitors C and constant current circuits 9 are provided instead of the current limiter circuits 8 in example 1.

An electrolytic capacitor C is connected in parallel to output ends of each full-wave rectifier circuit 7. The electrolytic capacitor C functions as a smoother circuit for smoothing a pulsating current output from the full-wave rectifier circuit 7 to provide a direct current.

Figure 17:
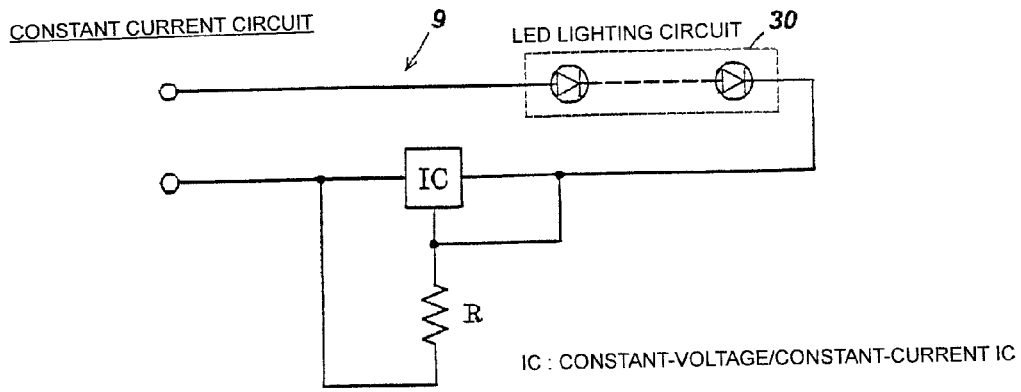
FIG. 17 is a circuit diagram illustrating an example of a constant current circuit in FIG. 16.

Between the electrolytic capacitors C and the output terminals 6A, 6B, respective constant current circuits 9, 9 are provided. As in an example illustrated in FIG. 17, each constant current circuit 9 can include a constant-voltage constant-current IC connected in series to an LED lighting circuit 30, and a resistance R connected to the IC. With this configuration, a current flowing in the LED lighting circuit 30 is limited to provide constant-current driving, thereby protecting LEDs included in the LED lighting circuit 30 from overcurrent.

Figure 18:
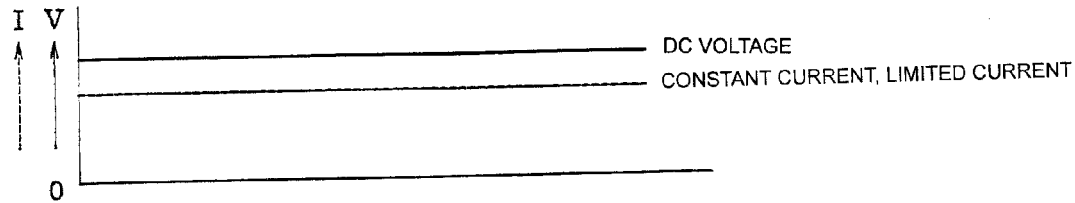
FIG. 18 is a waveform diagram of a voltage and a current at a point B in FIG. 16.

The power supply circuit 1 according to example 2 is configured as described above, a limited, constant current such as illustrated in FIG. 18 flows at point B in FIG. 16 and thus, flows in the LED lighting circuit 30. Accordingly, direct currents $DCI_A$, $DCI_B$ caused by variations of the loads are adjusted in the constant current circuits 9, enabling provision of $DCI_A = DCI_B$. Accordingly, input power supplied from a commercial power supply 10 is evenly divided and efficiently supplied to the two LED lighting circuits 30, 30. Furthermore, where $DCI_A = DCI_B$ for the direct currents, the load currents can be adjusted so as to provide $I_A = I_B$. Accordingly, only an extremely small current flowing in an autotransformer, and thus, a winding 4 in the autotransformer generates almost no heat. Accordingly, for reasons similar to those in example 1, the power supply circuit 1 can be downsized.

EXAMPLE 3

Figure 19:
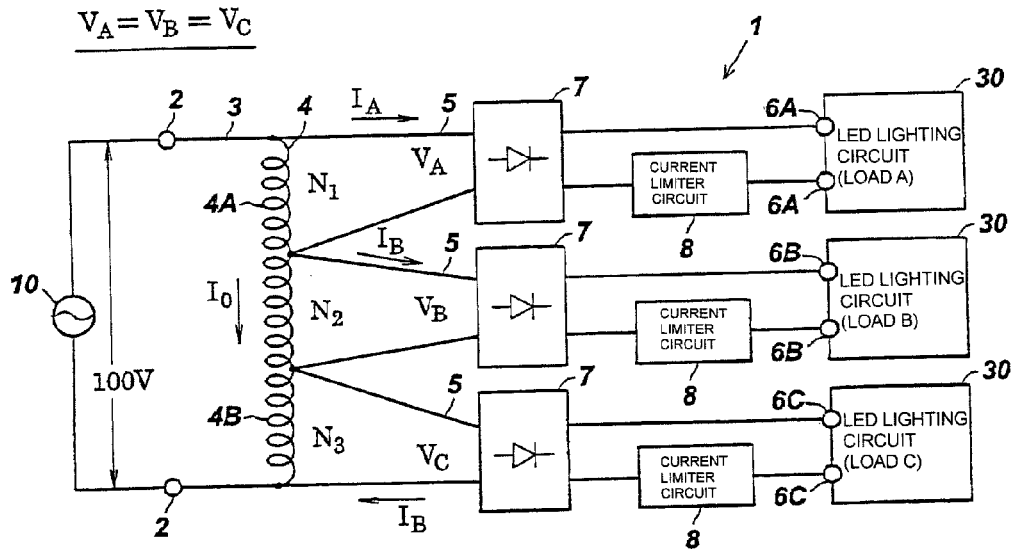
FIG. 19 is a circuit diagram illustrating a three-way divider/rectifier circuit according to example 3 of the present invention.

FIG. 19 illustrates a power supply circuit 1, which is an example of employing the power supply circuit according to the present invention for a power supply for LEDs by connecting the power supply circuit to LED lighting circuits 30 as in examples 1 and 2. In the Figure, the power supply circuit 1 is a three-way divider/rectifier circuit provided with three sets of output terminals 6, which are connected to respective LED lighting circuits 30.

First output terminals 6A from among the three sets of output terminals 6 are connected to a beginning end of a series winding 4A and a beginning end of a shunt winding 4B via a full-wave rectifier circuit 7 and a current limiter circuit 8. An LED lighting circuit 30 including an LED group including a plurality of LEDs connected in series, which is a load A, is connected to the first output terminals 6A. Second output terminals 6B are connected to the beginning end of the shunt winding 4B and a point in the shunt winding 4B via a full-wave rectifier circuit 7 and a current limiter circuit 8. An LED lighting circuit 30, which is a load B, is connected to the second output terminals 6B as with the first output terminals 6A. Third output terminals 6C are connected to the point in the shunt winding 4B and a terminal end of the shunt winding 4B via a full-wave rectifier circuit 7 and a current limiter circuit 8. An LED lighting circuit 30, which is a load C, is connected to the third output terminals 6C.

In the windings 4 resulting from the above-described three-way division, the turn counts of the respective partial windings are equal to one another, and thus, are set so as to provide $N_1 = N_2 = N_3$. Accordingly, load voltages resulting from the division are all equal to one another, and thus, $V_A = V_B = V_C$.

The power supply circuit 1 according to example 3 is configured as described above, and if currents flowing in the three loads A, B and C are equal to one another ($I_A = I_B = I_C$), the power supply circuit 1 can efficiently distribute input power supplied from a commercial power supply 10 to all the LED lighting circuits 30 even in the case of three-way division.

EXAMPLE 4

Figure 20:
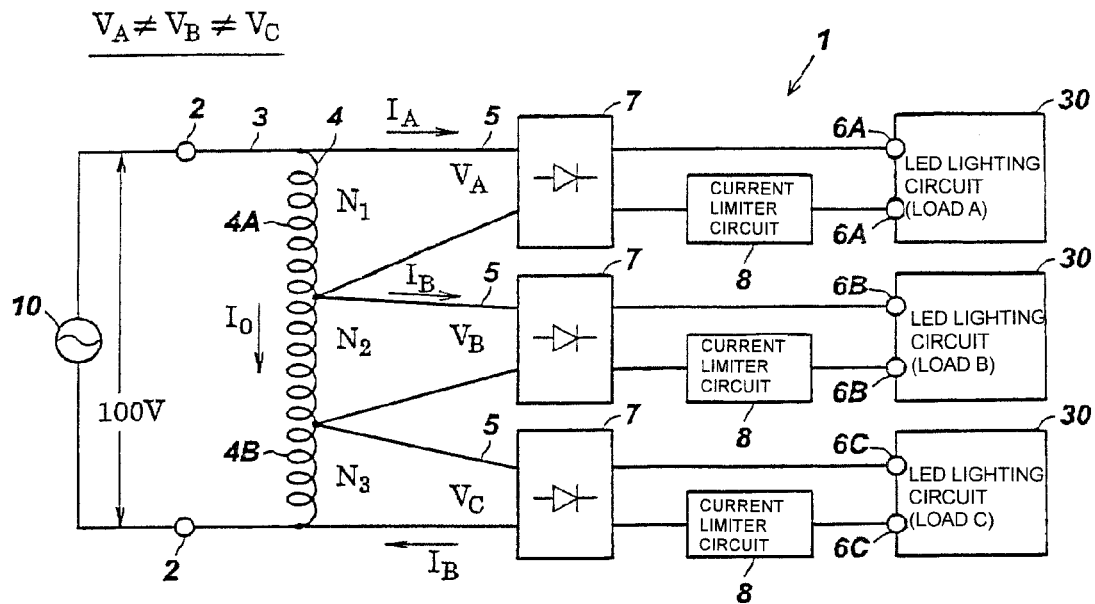
FIG. 20 is a circuit diagram illustrating a three-way divider/rectifier circuit according to example 4 of the present invention.

FIG. 20 illustrates a power supply circuit 1, which is a three-way divider/rectifier circuit as in example 3, but the power supply circuit 1 is provided for supply of different voltages resulting from division.

In this example, in winding 4 divided into three partial windings, the turn counts of respective partial windings are different from one another, and thus, are set to $N_1 \neq N_2 \neq N_3$. Accordingly, load voltages resulting from the division are different from one another, and thus, $V_A \neq V_B \neq V_C$.

The power supply circuit 1 according to example 4 is configured as described above, and this circuit also can efficiently distribute input power to all the LED lighting circuits 30 as with the above-described examples if currents flowing in the three loads A, B and C are equal to one another ($I_A = I_B = I_C$), even if load voltages $V_A$, $V_B$ and $V_C$ resulting from the division are not equal to one another.

EXAMPLE 5

Figure 21:
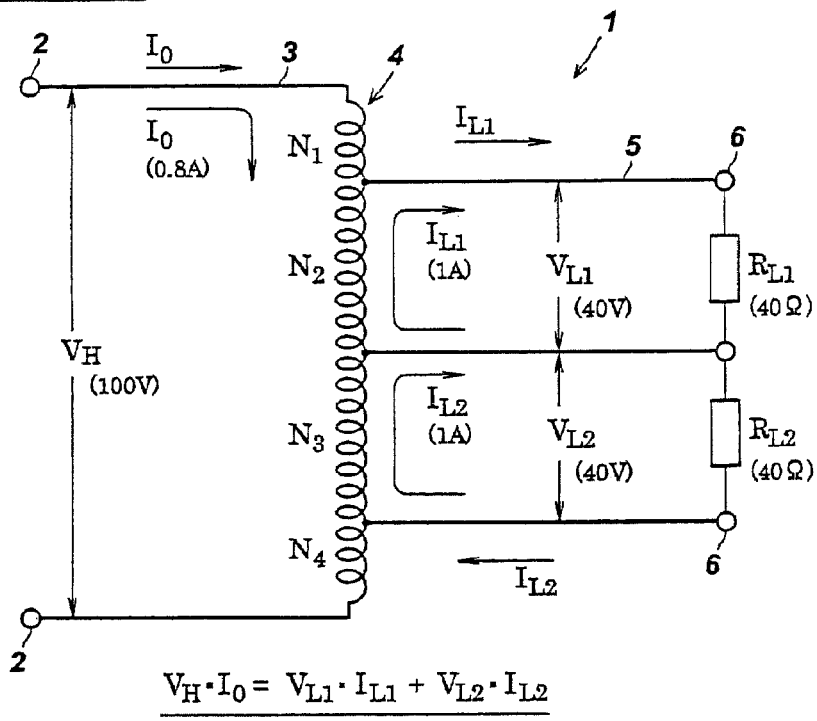
FIG. 21 is a circuit diagram illustrating a step-down/two-way divider circuit according to example 5 of the present invention.

FIG. 21 illustrates a power supply circuit 1, which is a two-way divider circuit as in examples 1 and 2, but is different from those in examples 1 and 2 in that the power supply circuit 1 steps an input voltage down and then divides and outputs the input voltage.

In the case of the power supply circuit 1 in the present example, a winding 4 includes: an end-part winding $N_1$ including a predetermined number of turns at a beginning end of the winding 4 left as a margin and an end-part winding $N_4$ including a predetermined number of turns at a terminal end of the winding 4 left as a margin; and partial windings $N_2$, $N_3$ resulting from dividing the part of the winding 4 between the end-part windings into two parts. Opposite ends of each of the partial windings $N_2$, $N_3$ are connected to output conductors 5, 5, and an end of each output conductor 5 is provided with an output terminal 6. With the power supply circuit 1, an input voltage input from input terminals 2, 2 via input conductors 3 is stepped down in the winding 4, and the stepped-down voltage is divided by the partial windings $N_2$, $N_3$, and power resulting from the division is output from the output terminals 6 via the output conductors 5.

Here, for the power supply circuit 1 according to the present example, the following can be seen.

Input-side power and output-side power are equal to each other ($V_H \cdot I_0 = V_{L1} \cdot I_{L1} + V_{L2} \cdot I_{L2}$).

However, $I_0 < I_{L1}$ and $I_0 < I_{L2}$.

Where a current flowing in the end-part winding $N_1$ is $I_0$, the current flowing in the partial winding $N_2$ is $I_0 - I_{L1}$; the current flowing in the partial winding $N_3$ is $I_0 - I_{L2}$; and the current flowing in the end-part winding $N_4$ is $I_0$.

Where $V_H = 100$ [V], $R_{L1} = R_{L2} = 40$ [Ω] and $V_{L1} = V_{L2} = 40$ [V], $I_{L1} = I_{L2} = 1$ [A] and $I_0 = 0.8$ [A].

If the turn counts of the end-part windings $N_1$ and $N_4$ are equal to each other, $I_0 = 0.8$ [A].

If the turn counts of the partial windings $N_2$ and $N_3$ are equal to each other, $I_0 - I_{L1} = I_0 - I_{L2} = 0.2$ [A].

Figure 22:
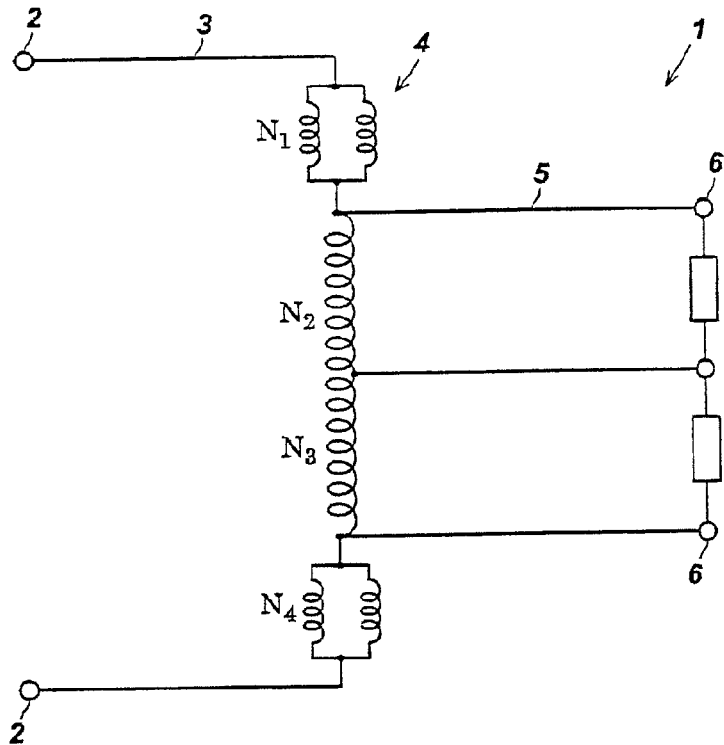
FIG. 22 is a circuit diagram illustrating a variation of the step-down/two-way divider circuit in FIG. 21.
Figure 23:
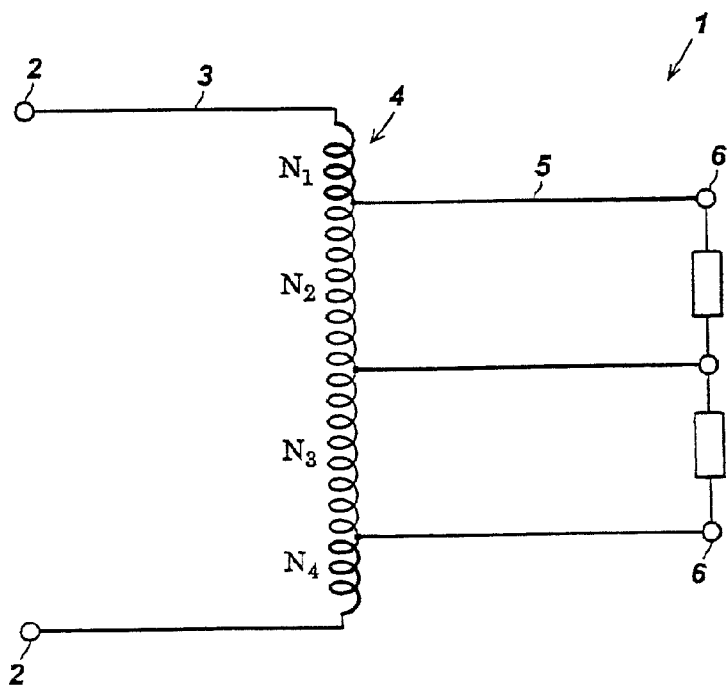
FIG. 23 is a circuit diagram illustrating another variation of the step-down/two-way divider circuit in FIG. 21.

Accordingly, in order to retrieve power more efficiently with energy loss suppressed, it is necessary to reduce the winding resistances of the end-part windings $N_1$, $N_4$ in which a larger current flows. Therefore, for a method for reducing the winding resistances, the configuration illustrated in FIG. 22 or 23 can be considered. In the circuit illustrated in FIG. 22, each of the windings $N_1$, $N_4$ is divided and connected in parallel, and in the circuit illustrated in FIG. 23, the wire diameters of the end-part windings $N_1$, $N_4$ are made to be larger than those of the partial windings $N_2$, $N_3$ and connected in series. In any of the configurations, the winding resistances of the end-part windings $N_1$ and $N_4$ are smaller compared to the circuit in FIG. 21, and thus, the energy loss can be reduced, enabling the voltage stepped down by the winding 4 to be efficiently divided and supplied to loads.

EXAMPLE 6

Figure 24:
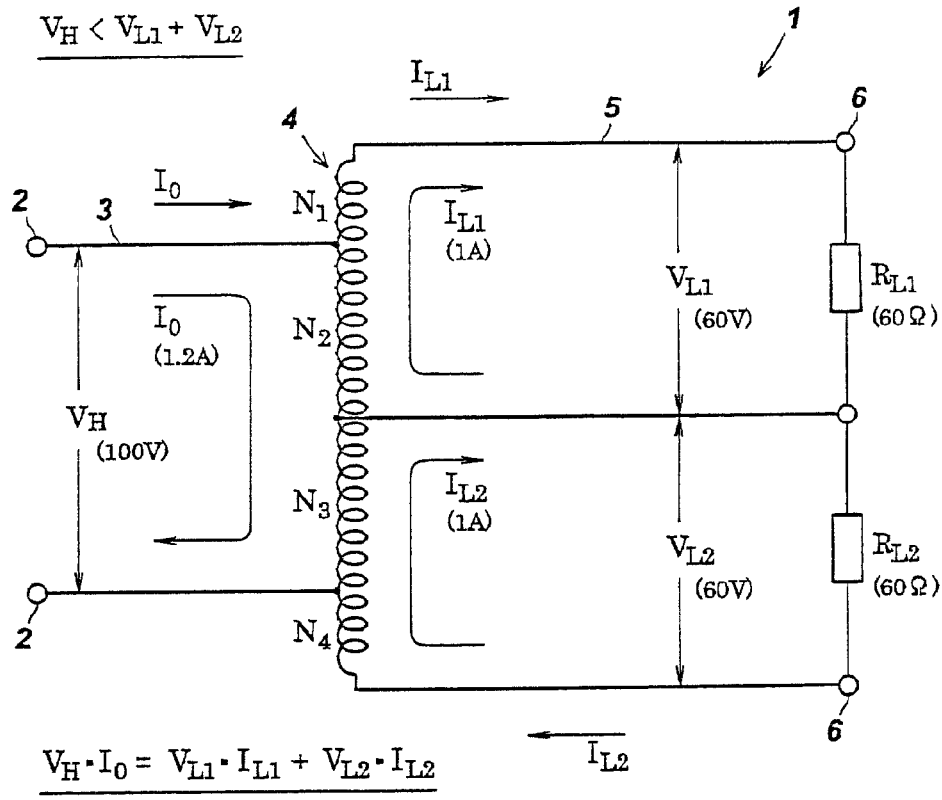
FIG. 24 is a circuit diagram illustrating a variation of a step-up/two-way divider circuit according to example 6 of the present invention.

FIG. 24 illustrates a power supply circuit 1 configured to step an input voltage up and divides and outputs voltages resulting from the division, as opposed to example 5.

The power supply circuit 1 according to the present example is similar to that in example 5 in that a winding 4 includes end-part windings $N_1$, $N_4$ and partial windings $N_2$, $N_3$, but different in that an input conductor 3, 3 is connected to opposite ends of each of the partial windings $N_2$, $N_3$. The power supply circuit 1 steps up an input voltage input from input terminals 2, 2 via the input conductors 3, in the winding 4, and divides the stepped-up voltage by means of the partial windings $N_2$, $N_3$, and outputs power resulting from the division from output terminals 6 via output conductors 5.

Here, for the power supply circuit 1 according to the present example, the following can be seen.

Input-side power and output-side power are equal to each other ($V_H \cdot I_0 = V_{L1} \cdot I_{L1} + V_{L2} \cdot I_{L2}$).

However, $I_0 > I_{L1}$ and $I_0 > I_{L2}$.

Where $V_H = 100$ [V], $R_{L1} = R_{L2} = 60$ [Ω] and $V_{L1} = V_{L2} = 60$ [V], $I_{L1} = I_{L2} = 1$ [A] and $I_0 = 1.2$ [A].

If the turn counts of the end-part windings $N_1$ and $N_4$ are equal to each other, currents flowing in $N_1$ and $N_4$ are both 1 [A].

If the turn counts of the partial windings $N_2$ and $N_3$ are equal to each other, currents flowing in $N_2$ and $N_3$ are both 0.2 [A].

Accordingly, in the present example, also, in order to retrieve power more efficiently with energy loss suppressed, it is necessary to reduce the winding resistances of the end-part windings $N_1$, $N_4$ in which a large current flows. For a method for reducing the winding resistances, as described with reference to FIGS. 22 and 23, a configuration in which the end-part windings $N_1$, $N_4$ are connected in series or a configuration in which the wire diameters of the end-part windings $N_1$, $N_4$ are increased and connected in series may be employed. In any of the configurations, the winding resistances of the end-part windings $N_1$, $N_4$ become small, and thus, the energy loss can be reduced, enabling the voltage stepped up by the winding 4 to be efficiently divided and supplied to loads.

OTHER EXAMPLES

Figure 25:
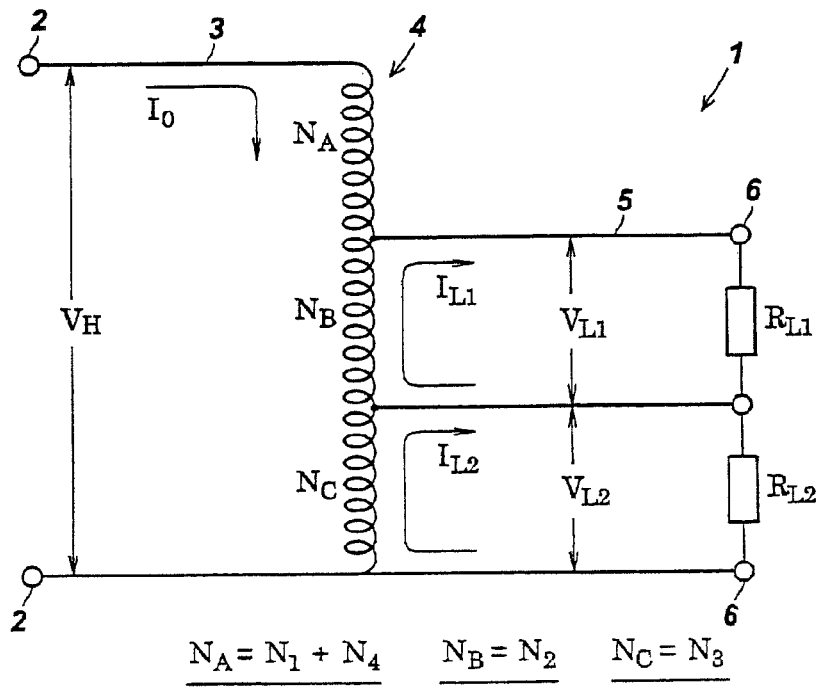
FIG. 25 is a circuit diagram illustrating a variation of the step-down/two-way divider circuit in FIG. 21.
Figure 26:
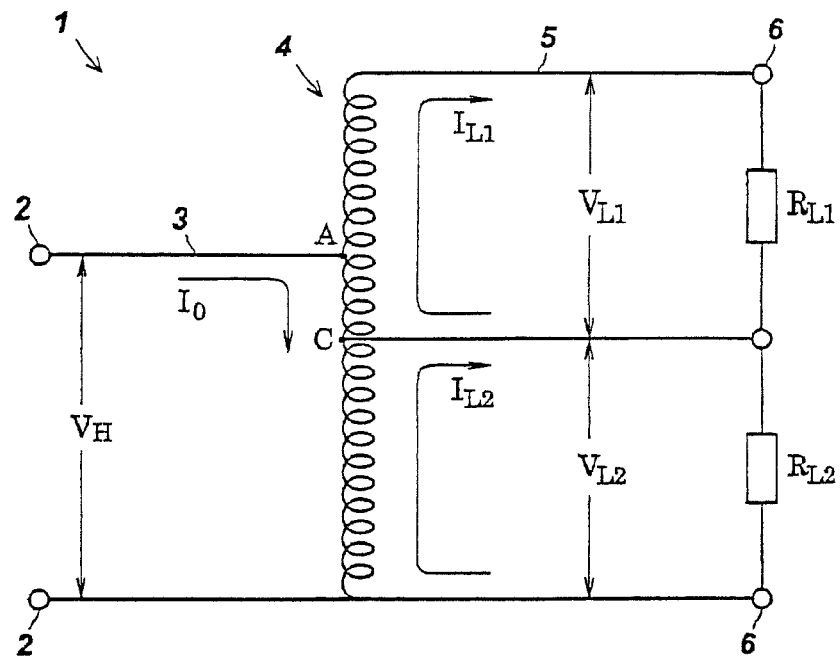
FIG. 26 is a circuit diagram illustrating a variation of the step-up/two-part divider circuit in FIG. 24.

Although in example 5, the output conductors 5, 5 are connected to the winding 4 with the end-part windings $N_1$, $N_4$ at the opposite ends of the winding 4 left as margins, instead of this configuration, as illustrated in FIG. 25, it is possible that: end-part windings $N_1$, $N_4$ are jointed; and output conductors 5, 5 are connected with only a beginning end (or terminal end) of a winding 4 left as a margin. Also, although in example 6, input conductors 3, 3 are connected to the winding 4 with the end-part windings $N_1$, $N_4$ at the opposite ends of the winding 4 left as margins, instead of this configuration, as illustrated in FIG. 26, it is possible that: end-part windings $N_1$, $N_4$ are joined; and input conductor 3, 3 are connected with only a beginning end (or a terminal end) of a winding 4 left as a margin. However, in the circuit in FIG. 26, if a midpoint C in the winding 4 to which the corresponding output conductor 5 is connected is overly close to a connection point A to which the corresponding input conductor 3 is connected, the energy loss unfavorably increases by that amount, resulting in efficiency deterioration. More specifically, it is preferable that the positions of the midpoint C and the connection point A be set so that the transformation ratio between input voltage and output voltage in the winding 4 falls within a range of around 1:1 to 1:5.

Although in the Figures of examples 5 and 6, for ease of illustration, one of the output conductors 5, 5 and one of the output terminals 6, 6 are shared, the power supply circuit 1 according to the present invention requires the respective output conductors 5 and the respective output terminals 6 to be independent as in, e.g., example 1, in order to connect individual loads independently to the power supply circuit 1.

Although the above-described examples have been described in terms of examples in which a winding 4 in a power supply circuit 1 is divided into two or three parts, the number of parts is not limited to those in the examples, and a similar effect can be provided with a circuit in which a winding 4 is divided into four or more parts. Also, although LED lighting circuits 30 are connected to a power supply circuit 1 as loads, another electronic device, for example, an LED device such as an electronic billboard, colored lights or a signboard, or a heater device such as a floor heater or a snow-melting system, can also be connected to the power supply circuit 1.

What is claimed is:

1. A power supply circuit for LED light circuit comprising:
an input terminal to be connected to a commercial power supply;
an input conductor connected to the input terminal;
a winding connected to the input conductor;
a plurality of output conductors connected to respective partial windings resulting from dividing the winding into a plurality of parts;
a plurality of output terminals connected to the respective output conductors, each output terminal being independently connected to a LED light circuit as a load;
a rectifier circuit, provided between the output terminals and the output conductors, converts an alternate-current voltage resulting from division in the respective partial windings into a direct-current voltage; and
a current limiter circuit, provided at an output end of the rectifier circuit, limits a current flowing into the LED light circuit,
wherein the output conductors are connected to the respective partial windings with an end part of the winding left as a margin, an input voltage is stepped down in the winding, and the stepped-down voltage is divided and output, and
further wherein end-part windings left as a margin are configured to be connected in parallel.

2. The power supply circuit according to claims 1, wherein the winding is evenly divided in terms of a turn count.

3. The power supply circuit according to claim 2, wherein the output conductors are connected to the respective partial windings with an end part of the winding left as a margin, an input voltage is stepped down in the winding, and the stepped-down voltage is divided and output.

4. The power supply circuit according to claim 2, wherein the input conductor is connected to the winding with the end part of the winding left as a margin, an input voltage is stepped up in the winding, and the stepped-up voltage is divided and output.

5. The power supply circuit according to claim 1, wherein wire diameters of the end-part windings left as a margin are configured to be larger than those of other partial windings.

6. A power supply circuit for LED light circuit comprising:
an input terminal to be connected to a commercial power supply;
an input conductor connected to the input terminal;
a winding connected to the input conductor;
a plurality of output conductors connected to respective partial windings resulting from dividing the winding into a plurality of parts;
a plurality of output terminals connected to the respective output conductors, each output terminal being independently connected to a LED light circuit as a load;
a rectifier circuit, provided between the output terminals and the output conductors, converts an alternate-current voltage resulting from division in the respective partial windings into a direct-current voltage; and a current limiter circuit, provided at an output end of the rectifier circuit, limits a current flowing into the LED light circuit, wherein the input conductor is connected to the winding with the end part of the winding left as a margin, an input voltage is stepped up in the winding, and the stepped-up voltage is divided and output, and further wherein the end part of the windings left as a margin are configured to be connected in parallel.

7. The power supply circuit according to claims 6, wherein the winding is evenly divided in terms of a turn count.

8. The power supply circuit according to claim 7, wherein the output conductors are connected to the respective partial windings with an end part of the winding left as a margin, an input voltage is stepped down in the winding, and the stepped-down voltage is divided and output.

9. The power supply circuit according to claim 7, wherein the input conductor is connected to the winding with the end part of the winding left as a margin, an input voltage is stepped up in the winding, and the stepped-up voltage is divided and output.

10. The power supply circuit according to claim 6, wherein wire diameters of the end-part windings left as a margin are configured to be larger than those of other partial windings.

11. A power supply circuit for LED light circuit comprising:

an input terminal to be connected to a commercial power supply;

an input conductor connected to the input terminal;

a winding connected to the input conductor;

a plurality of output conductors connected to respective partial windings resulting from dividing the winding into a plurality of parts;

a plurality of output terminals connected to the respective output conductors, each output terminal being independently connected to a LED light circuit as a load;

a rectifier circuit, provided between the output terminals and the output conductors, converts an alternate-current voltage resulting from division in the respective partial windings into a direct-current voltage; and a constant current circuit, provided at an output end of the rectifier circuit, limits a current flowing in the LED lighting circuit to provide constant-current driving, wherein the output conductors are connected to the respective partial windings with an end part of the winding left as a margin, an input voltage is stepped down in the winding, and the stepped-down voltage is divided and output, and further wherein end-part windings left as a margin are configured to be connected in parallel.

12. The power supply circuit according to claim 11, wherein the winding is evenly divided in terms of a turn count.

13. The power supply circuit according to claim 12, wherein the output conductors are connected to the respective partial windings with an end part of the winding left as a margin, an input voltage is stepped down in the winding, and the stepped-down voltage is divided and output.

14. The power supply circuit according to any one of claims 12, wherein the input conductor is connected to the winding with the end part of the winding left as a margin, an input voltage is stepped up in the winding, and the stepped-up voltage is divided and output.

15. The power supply circuit according to claim 11, wherein the wire diameters of the end-part windings left as a margin are configured to be larger than those of other partial windings.

16. A power supply circuit for LED light circuit comprising:

an input terminal to be connected to a commercial power supply;

an input conductor connected to the input terminal;

a winding connected to the input conductor;

a plurality of output conductors connected to respective partial windings resulting from dividing the winding into a plurality of parts;

a plurality of output terminals connected to the respective output conductors, each output terminal being independently connected to a LED light circuit as a load;

a rectifier circuit, provided between the output terminals and the output conductors, converts an alternate-current voltage resulting from division in the respective partial windings into a direct-current voltage; and a constant current circuit, provided at an output end of the rectifier circuit, limits a current flowing in the LED lighting circuit to provide constant-current driving, wherein the input conductor is connected to the winding with the end part of the winding left as a margin, an input voltage is stepped up in the winding, and the stepped-up voltage is divided and output, and further wherein the end part of the windings left as a margin are configured to be connected in parallel.

17. The power supply circuit according to claims 16, wherein the winding is evenly divided in terms of a turn count.

18. The power supply circuit according to claim 17, wherein the output conductors are connected to the respective partial windings with an end part of the winding left as a margin, an input voltage is stepped down in the winding, and the stepped-down voltage is divided and output.

19. The power supply circuit according to claim 17, wherein the input conductor is connected to the winding with the end part of the winding left as a margin, an input voltage is stepped up in the winding, and the stepped-up voltage is divided and output.

20. The power supply circuit according to claim 16, wherein the wire diameters of the end-part windings left as a margin are made to be larger than those of other partial windings.

* * * * *